United States Patent [19]

Vincent

[11] 4,236,507
[45] Dec. 2, 1980

[54] DOME SOLAR AIR HEATER

[76] Inventor: Ogden W. Vincent, 2166 La Miel Way, Campbell, Calif. 95008

[21] Appl. No.: 842,927

[22] Filed: Oct. 17, 1977

[51] Int. Cl.³ .............................................. F24J 3/02
[52] U.S. Cl. ..................................... 126/450; 126/449
[58] Field of Search ............... 126/270, 271, 400, 450, 126/449, 444, 446, 445, 432; 237/1 A; 165/48, 49, 48 S

[56] References Cited

U.S. PATENT DOCUMENTS

| | | | |
|---|---|---|---|
| 3,244,186 | 4/1966 | Thomason et al. | 126/270 |
| 3,894,345 | 7/1975 | Zeltmann | 126/270 |
| 3,949,732 | 4/1976 | Reines | 126/270 |
| 4,015,582 | 4/1977 | Liu et al. | 126/270 |
| 4,031,674 | 6/1977 | Rand | 126/270 |
| 4,060,195 | 11/1977 | Rapp, Jr. et al. | 237/1 A |
| 4,116,219 | 9/1978 | Nurnberg | 237/1 A |
| 4,143,642 | 3/1979 | Beaulieu | 237/1 A |
| 4,143,814 | 3/1979 | Hill | 237/1 A |

Primary Examiner—James C. Yeung

[57] ABSTRACT

A solar heater that heats air is described. The solar heater has a shape like a dome with a transparent outer cover and transparent inner cover. A dead air layer is inbetween covers. Inside the dome is a collector that holds up the covers and converts the solar rays to heat. Air or gas is circulated through the solar heater from an input pipe on one side to an output pipe on the other side, obtaining heat from the collector and base by conduction and radiation.

10 Claims, 3 Drawing Figures

DOME SOLAR AIR HEATER

BACKGROUND OF THE INVENTION

Past inventions for heating air have been mostly flat plate type of solar heaters. This type of heater is usually attached to a roof top that faces a southern direction in the northern hemisphere so as to be facing in the direction of the sun. The energy conversion of flat plate type of solar heaters is good when the sun rays come directly at the flat plate at an angle of 90 degrees. However, the conversion is very poor at low angles of solar rays such as 30 degrees which happens in the early morning and late afternoon. Also, the sun is constantly changing inclination. Therefore the flat plate can only reach full conversion at noon on a few days of the year if it is held in a fixed position. Of course, a flat plate can be moved continually or periodically which requires a moving device either manual or automatic.

Another type of solar heater is one which employs a reflector such as a parabolic cylinder. To be most effective this type of solar heater must be moved constantly so that the reflector is pointed in the direction of the sun. Then at least one axis is in the direction of the sun to concentrate the sun rays on a collector such as a pipe. Some means of moving the reflector is usually required either manual or automatic. Since the sun is constantly changing inclination during the year, the reflector must change direction to achieve maximum conversion.

In contrast to the past inventions, this new invention provides an almost constant collector area to the sun because it is round-like in shape. It is well known that a sphere does present a constant perpendicular area to the sun rays. So the dome-like shape is fashioned after a sphere and is half a sphere on the top. The half sphere protrudes from a base. Therefore, the dome-like structure collects radiation energy at low angles of solar rays in the early morning and late afternoon when conversion is almost the same as conversion at noon time. The conversion is as high in the winter as it is in the summer because no change of angle is needed to compensate for changes in inclination. The dome-like solar heater can remain in a fixed southerly position at all times in the northern hemisphere.

There have been past inventions which use a dome-like structure. For instance, there are tents that are airtight and that use air pressure to hold them up. One such tent utilizes the sun rays to heat the air and other things inside. Usually these tents have no structure inside, but utilize air pressure to hold them up. Of course there will be some air pressure in the new invention, but a collector structure holds the cover in place. There is one past invention that is a transparent long tube which is held up by air pressure. Radar domes are similar to the tents described above, are non-metallic and are opaque to sun rays. None of the inventions mentioned in this paragraph contains all of the features of the new invention.

SUMMARY OF THE INVENTION

The dome-like solar heater has as outside appearance that looks like a dome. The top is like half of a sphere, and the bottom is like part of a cylinder. The outer cover is a transparent sheet of material that is held up by a collector framework. Inside the outer cover is an inner cover which is another layer of transparent sheet material to provide a dead air insulating layer between inner and outer covers. Inside the dome-like inner cover is air or gas. The collector is a number of fins radiating from the center. Each fin is shaped like the outline of a dome on the outside. There are holes in the fins to allow air or gas circulation. Air or gas enters one side of the solar heater by an input pipe and leaves the other side by an output pipe. There is a base upon which the collector is mounted as well as the covers. A heating system is described which includes a house, a reservoir, a solar heater, valves, thermostats, piping, a blower, a motor, and electronics.

DETAILED DESCRIPTION

Figure 1:
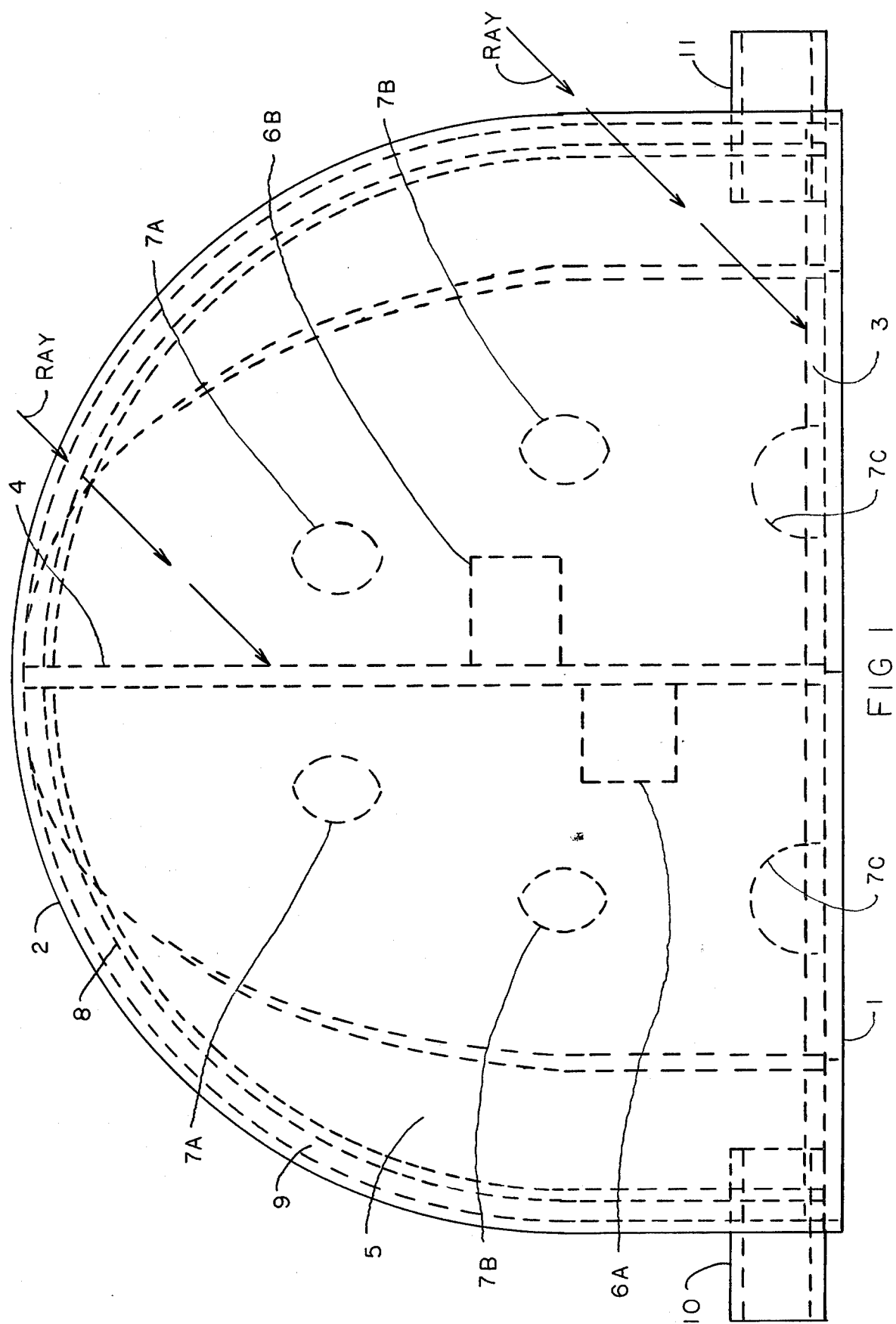
FIG. 1 is the side view of the solar heater.

The solar heater has a dome-like shape as shown in FIG. 1. One version of the invention is the prototype which has a top shaped like half a sphere and a bottom shaped like a cylinder. The cylinder part has a length which is approximately equal to half the radius of the sphere part. The shape of the solar heater gives the collector 4 and base 1 a side perpendicular area which is approximately equal to the top perpendicular area. In other words the collector 4 and base 1 receive the same amount of solar rays no matter what direction the solar rays are coming from. Of course, the solar heater must be positioned toward the south in the northern hemisphere so that the angle between base 1 and the sun is always positive. This condition is easily met by placing the solar heater on a part of the house roof that slants down in the southern direction in the northern hemisphere.

The base 1 is a supporting member as well as an insulating member. In the prototype the base 1 is a piece of plywood which has the shape of an octagon that fits inside the circle made from the radius of the top sphere part. The octagon shape is used to provide an easy way to make an outer cover 2 conform with base 1. On top of base 1 is an insulating material 3 which can be glass wool as used in the prototype to keep the heat from escaping air or gas 5. Other layers such as wood or aluminum sheet can be included on top of material 3 to conduct and radiate heat to air or gas 5. The top of material 3 is painted with a layer of dark material that absorbs solar rays because some of the solar rays are converted to heat by material 3. Some air or gas 5 is heated by material 3.

Figure 2:
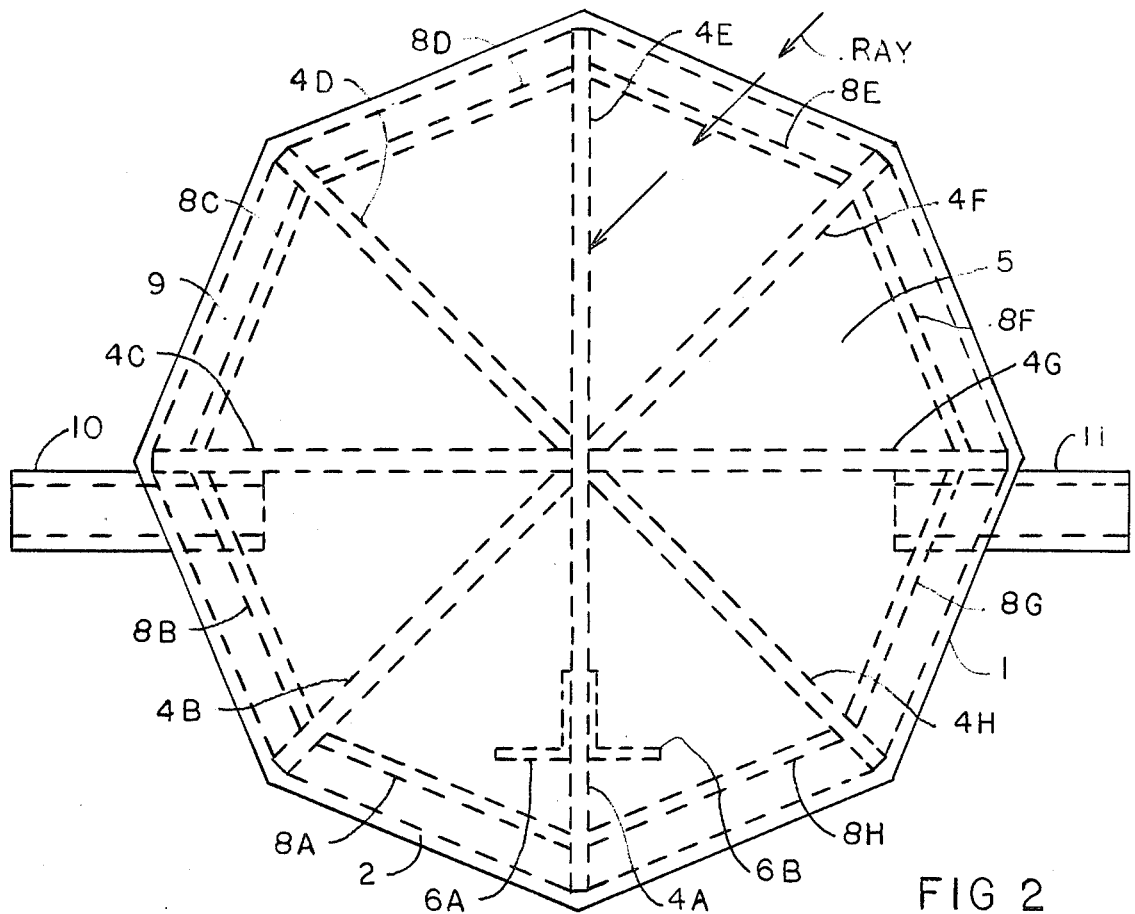
FIG. 2 is the top view of the solar heater.

Attached to base 1 is a collector 4 which is a supporting structure for outer cover 2 and inner cover 8 as well as a heat producing structure. Collector 4 is screwed to base 1 by the use of angle brackets in the prototype. Collector 4 is made of eight fins 4A, 4B, 4C, 4D, 4E, 4F, 4G, and 4H which extend from the center as shown in FIG. 2. The number of fins is optional, eight being used in the prototype. Collector 4 is coated with a dark material that absorbs solar rays, changing the solar energy to heat energy. Collector 4 is painted black in the prototype. The air or gas 5 within the solar heater is heated by conduction and radiation, being in contact with collector 4 and material 3. There is a large area on collector 4 to facilitate an exhange of heat. To further facilitate heat exchange, heat radiators such as 6A and 6B can be attached to collector 4 to add more radiation area. Radiator 6 can be made of sheet aluminum. Collector 4 can be made of plywood as in the prototype or of aluminum or of a combination of both. A sheet of thin aluminum over plywood can be used for collector 4. Holes 7 are cut in collector 4 so as to allow the movement of air or gas from the input side to the output side of the solar heater. The number and size of the holes 7 are optional. Three holes 7A, 7B, and 7C are used in Fins 4A through 4H in the prototype.

A transparent outer cover 2 is attached to collector 4 and base 1. In the prototype outer cover 2 is a plastic material called vinyl which is 20 mils thick. Vinyl is a tough clear insulating material that is commonly used as a substitute for glass. Vinyl bends easily and withstands sunlight well. Furthermore, vinyl is relatively inexpensive compared to glass or other plastics. A second inner cover 8 is made of a transparent material also, being made of 20 mil vinyl in the prototype. Inner cover 8 has the same shape as cover 2 and is spaced inwards a short distance from outer cover 2. In the prototype the spacing between outer cover 2 and inner cover 8 is approximately one inch. The purpose of the inner cover 8 is to provide an insulating dead air layer 9 between outer cover 2 and inner cover 8. It is outer cover 2 that gives the solar heater a dome-like appearance. Inner cover 8 is made up of several sections, being eight individual sections in the prototype. Cover 8A stretches between fin 4A and fin 4B. Cover 8B stretches between fins 4B and 4C and so forth for covers 8C to 8H. Inner cover 8A is attached to fins 4A and 4B and to base 1. Plastic wire rod and tacks are used to hold and seal inner covers 8A through 8H in the prototype. In a similar way outer cover 2 can be held down with plastic wire rod and tacks to make a good gas seal. Covers 2 and 8 must be relatively air tight.

An input pipe 10 is attached to base 1 and fin 4C. Air or gas 5 enters the solar heater through input pipe 10. An output pipe 11 is attached to base 1 and fin 4G. Air or gas 5 leaves the solar heater through output pipe 11. Pipes 10 and 11 must be insulated pipes to prevent the loss of air or gas heat to the atmosphere. Any type of pipe is suitable as long as the outside portion is insulated for example by glass wool.

HEATER SYSTEM

Figure 3:
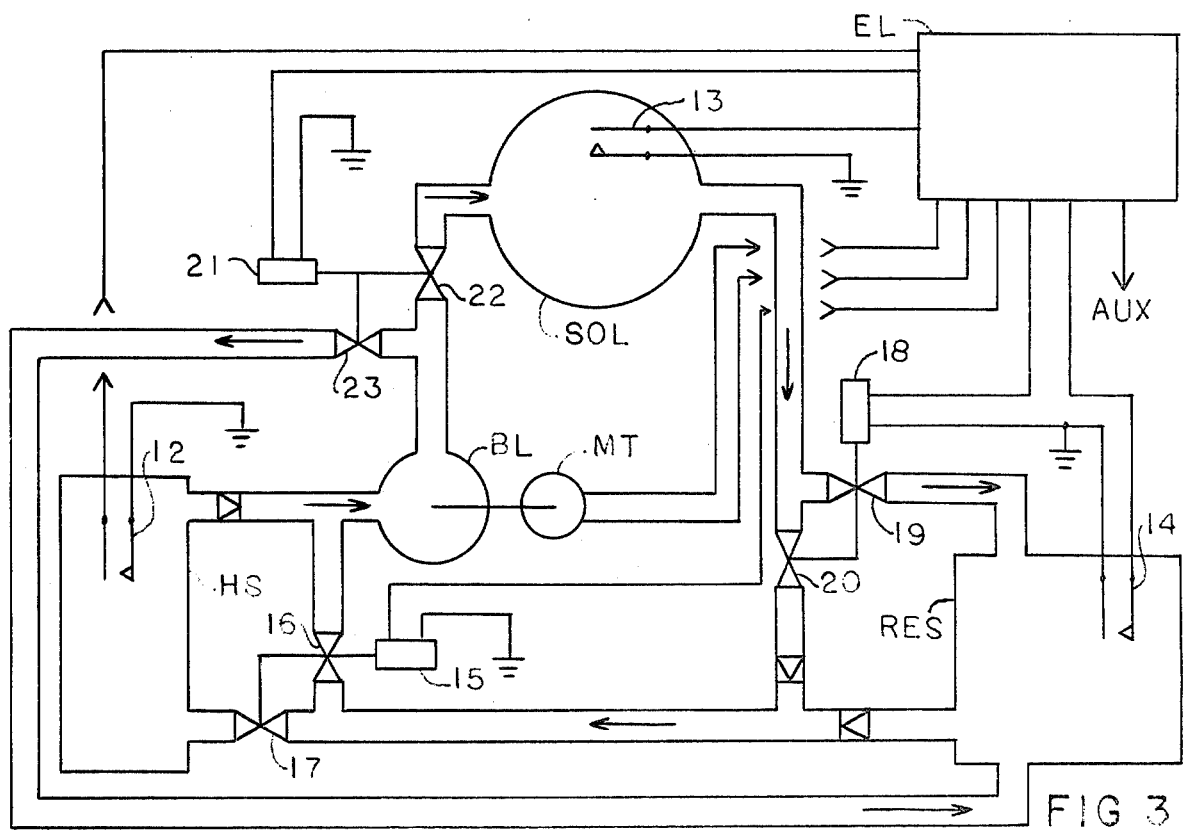
FIG. 3 is a block diagram of a heating system utilizing the solar heater.

To utilize the solar heater it must be used in an efficient heater system such as shown in FIG. 3. One reason for a heater system is that the solar heater SOL must be kept cool by moving air or gas. Otherwise an excessive temperature will build up inside solar heater SOL which is designed to retain heat. The solar constant is 30.6 calories per sec per sq ft. A dome solar heater SOL 8 feet in diameter could receive half the solar heat from the sun which would be 770.5 cal per sec. Without loss of heat the air inside solar heater SOL would heat up 20 degrees C. in one minute. Actually it takes much longer than that due to time lags in transfer and due to heat loss. However, with good insulation and proper cooling due to air or gas circulation most of the incident radiation on collector 4 and base 1 is recovered. Thus a system like FIG. 3 is required.

When thermostat 12 closes indicating house HS is cold, electronics EL starts motor MT if either the solar heater thermostat 13 or the reservoir thermostat 14 is closed indicating a higher temperature than room temperature. Assuming solar heater thermostat 13 to be closed, electronics EL energizes solenoid 15 which closes valve 16 and opens valve 17. Solenoids 18 and 21 are not energized, and valves 20 and 22 are normally open while valves 19 and 23 are normally closed. Motor MT is started by electronics EL, motor MT driving blower BL. Hot air from solar heater SOL goes through valve 20, valve 17, house HS, blower BL, and valve 22 and back to solar heater SOL.

After house HS becomes heated, thermostat 12 opens. Assuming thermostat 13 to be closed and thermostat 14 to be open or closed, electronics EL deenergizes solenoid 15 and energizes solenoid 18. Solenoid 21 remains deenergized. Valves 16, 19, and 22 are open. Hot air from solar heater SOL now goes through valve 19, reservoir RES, valve 16, blower BL and valve 22 and back to solar heater SOL. In this condition reservoir RES becomes heated by hot air from solar heater SOL. Reservoir RES is heated some 20 or more degrees higher than house HS by sunset.

As the sun begins to set solar heater SOL receives less heat from the sun. When solar heater SOL does not heat the incoming air on the last cycle, reservoir RES will heat solar heater SOL. When thermostat 12 closes indicating house HS is cold, thermostat 13 will be closed. Electronics EL directs the air from solar heater SOL through valves 20, 17, and 22. Now house HS will cool solar heater SOL until thermostat 13 opens. Then logic circuitry in electronics EL deenergizes solenoid 18 and energizes solenoid 15 and 21. Air from blower BL goes through valve 23, reservoir RES, valve 17, and house HS and back to blower BL. Then when thermostat 12 opens with thermostat 14 closed and thermostat 13 open, blower BL is shut off. Then when thermostat 12 closes again, blower BL starts again.

Reservoir RES is designed to store the excess heat generated by solar heater SOL. Usually two or more solar heaters SOL are required to heat house HS and reservoir RES. Two or more solar heaters SOL can be connected together, for example in parallel. The system remains unchanged except for adding other solar heaters SOL. One thermostat in the exit pipe is all that is needed. Reservoir RES can be made of a pile of round rocks or a pile of stacked wood. Ideally reservoir RES should be located in house HS so that the escaping heat heats house HS, and no excessive insulation is required. A pile of eucalyptus timbers is an ideal reservoir for house HS because eucalyptus is light and retains heat well.

When the heat in reservoir is exhausted at night, house HS will start cooling reservoir RES, and thermostat 14 will open. With thermostats 12, 13, and 14 all open, electronics EL stops motor MT and deenergizes solenoids 15, 18, and 21. A signal from electronics EL is sent to an auxiliary heater AUX which takes over the heating function. It is understood that all air carrying parts exposed to the atmosphere are insulated in FIG. 3.

It is to be understood that the embodiment described herein is merely illustrative of the principles of the invention. Various modifications thereto may be effected by persons skilled in the art without departing from the spirit and scope of the invention.

What is claimed is:

1. A dome-like solar heater comprising:
   (a) a base having a generally round shape, said base being a structural member, means to hold said base in relation to the earth in such a direction as to receive solar rays, means to insulate said base so as to reduce the passage of heat to the atmosphere, a dark coating being applied to the top of said base for the purpose of absorbing solar rays and producing heat, thereby heating air or gas within said solar heater, (b) a collector means positioned in the center of said base for the purpose of collecting solar rays and producing heat, said collector means being a plurality of fins which are coated with a dark radiation-absorbing coating, said fins further including holes to allow passage of air or gas therethrough, the outline of said fins being the general shape of said dome-like structure, (c) a transparent inner cover being supported by said plurality of fins and attached to said base, said inner cover having a gas seal to prevent gas passage therefrom, (d) a transparent outer cover being supported by said plurality of fins and attached to said base, the shape of said outer cover being a dome-like surface, said outer cover being spaced a small distance from said inner cover so as to have a dead air layer inbetween for insulation, said outer cover providing a gas seal to prevent gas passage therefrom, and (e) an insulated input pipe being attached to said inner cover, and an insulated output pipe being attached to the opposite side of said inner cover, means to introduce air or gas into the space between said inner cover and said fins and through said output pipe.

2. The solar heater of claim 1 wherein said fins meet at the center of said solar heater and extend to meet and hold said outer cover.

3. The solar heater of claim 2 wherein heat dissipators are attached to said fins for conducting and radiating heat to the air or gas, and said heat dissipators increasing the radiation area of said collector means.

4. The solar heater of claim 3 wherein said base is a sheet of material which has been shaped into a many sided figure, and the corners of said base meeting the horizontal ends of said fins.

5. The solar heater of claim 1 wherein said inner and outer covers are made of sheet plastic.

6. The solar heater of claim 1 wherein said fins and said base are made of plywood, and said base having a layer of insulation on the top.

7. The solar heater of claim 6 wherein said fins and said base have sheet metal applied to the surface for the purpose of conducting and radiating heat to the air or gas, and said sheet metal having a dark radiation absorbing coating applied thereto.

8. The solar heater of claim 1 included in an electro-mechanical means for automatically heating an enclosed structure, said electro-mechanical means including a blower with a motor, the input of said blower being connected by pipes and valves to said enclosed structure, said output pipe, and a reservoir, the output of said blower being connected by pipes and valves to said input pipe and said reservoir, said output pipe also being connected by pipe and a valve to said reservoir, said reservoir also being connected by pipe and valves to said enclosed structure, control electronics receiving signals from thermostats in said solar heater, said reservoir, and said enclosed structure; said electronics controlling said motor and a plurality of electric valves in air pipes, hot air from said solar heater being routed to said enclosed structure when cold, hot air from said solar heater being routed to said reservoir when said enclosed structure is warm, hot air from said reservoir being routed to said enclosed structure when said enclosed structure and said solar heater are both cold, and said electronics starting an auxiliary heater when said solar heater and said reservoir are both cold.

9. The solar heater of claim 1 wherein said collector means includes at least one semi-continuous sheet of radiation absorbing and heat radiating material which has a dome-like shape and which is inside said second inner cover, said sheet having a plurality of holes that allow free movement of air or gas from one side of said sheet to the other side, and a means for creating an air or gas gap between said sheet and said inner cover for air or gas movement.

10. The solar heater of claim 9 wherein said sheet of material comprises sections of material, and each said section of said sheet being located between and supported by adjacent said fins.

* * * * *